Figure 1:
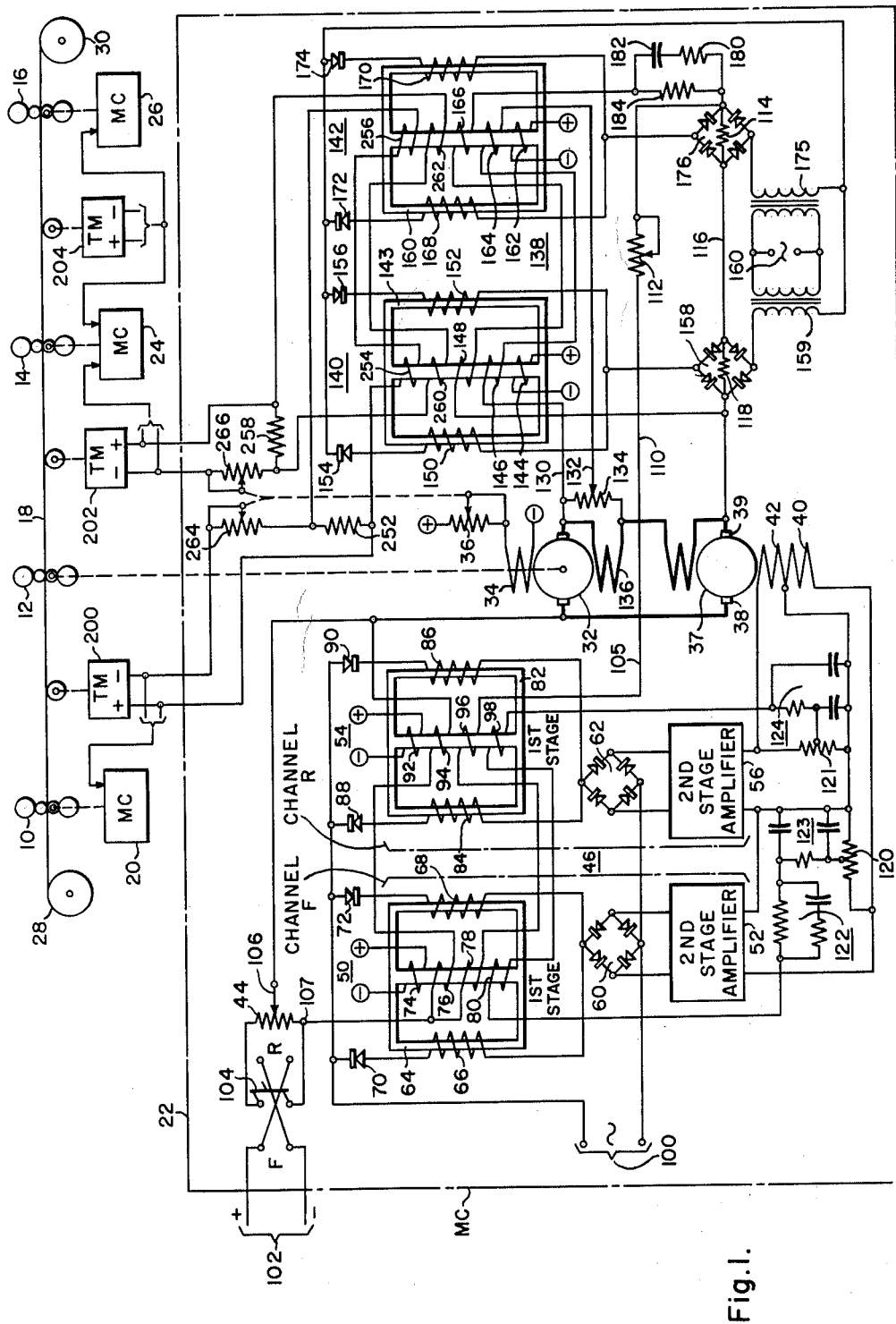

3,160,802
GENERATOR-FED MOTOR CONTROL FOR PLURAL STAND TENSIONING SYSTEM WITH TENSIONLESS IR COMPENSATION
Donald E. Abell, Lancaster, N.Y., assignor to Westinghouse Electric Corporation, East Pittsburgh, Pa., a corporation of Pennsylvania
Filed May 31, 1961, Ser. No. 113,938
13 Claims. (Cl. 318—6)

This invention relates to motor control systems and more particularly to a system for controlling a motor which drives apparatus subjected to a plurality of load components.

It is a well known practice to introduce IR drop compensation in speed regulating systems for motors which perform their regulating function by regulating the motor supply voltage, in response to a comparison of the supply voltage with a reference. The IR compensation is usually provided by injecting into the regulating control circuit, a signal component which is a function of the IR drop in the motor armature circuit loop. Thus the regulating control circuit is acted upon by components respectively responsive to motor supply voltage, the reference, and the IR drop. The supply voltage component is in the direction tending to decrease the supply voltage, while the reference and IR components are in the direction which tends to increase the supply voltage.

The IR component is a function of the entire load on the motor which includes a plurality of load components or factors. In its broader aspects the present invention is directed to deleting from the IR compensation at least a part of the effect of a particular one of the many load components which form the motor load.

In a strip rolling mill, the load on a stand motor includes rolling load, tension load, and acceleration load. The IR compensation injected into the regulating circuit of the motor is a function of the motor load current, and is usually derived from the drop across a circuit element in the motor armature loop, for example, a motor interpole winding or a series resistor. Since the motor load current includes components due to rolling, tension, and acceleration loads, the IR compensation compensates the regulating circuit for all these components. In the early development of cold strip rolling mills, it was found that IR compensation of the individual stand motors greatly improved the operation of the mill. The addition of IR compensation in the regulating circuit provides a better total speed signal to the regulating circuit. IR compensation alters the effective mechanical time delays of stand motors so that by selecting the proper amount of IR compensation the motor and thus the stands can be made to accelerate more closely to a common reference. IR compensation also aids in threading the strip into the stands by preventing the stand motor from stalling due to its regulation at low voltage. Also IR compensation enables a stand motor to break away from a stall condition. In accordance with one embodiment of this invention, IR compensation for rolling and acceleration loads only is introduced into the regulating circuit of a mill stand motor so that the mill will be highly compensated for threading and accelerating but will appear "soft" as far as tension changes are concerned.

In accordance with one embodiment of the invention the component due to tension load is deleted from the IR compensation before it is applied to the regulating circuit, thus providing IR compensation for rolling and acceleration loads only, so that the mill will appear highly compensated for threading and accelerating but will appear "soft" as far as tension changes are concerned. The advantages of this system can be demonstrated by considering a stand with heavy rolling load followed by a stand with little rolling load and heavy tension load. If stopped with strip in the mill, the first stand will have difficulty in breaking away. The second stand will break away easily and pull hard on the strip. If IR compensated, this "stall" tension will serve to increase tension until either the first stand breaks away or the strip is broken. However, with IR compensation in accordance with this invention, the tension between stands would not build up to the breaking point since the tension load would not be compensated. In a specific example, the tension component is removed from the IR compensation by mixing a signal obtained from a tension detector into the compensation derivation network thereby to subtract from the IR compensation the effects of the tension component.

It is therefore an object of the present invention to subtract at least a part of the effect of one of a plurality of motor load components from the IR compensation injected in a regulating circuit of the motor.

Another object of the invention is to oppose the effect of one of a plurality of motor load components in the IR compensation injected into a speed regulating circuit of the motor.

Another object of the invention is to remove the tension load component from the IR compensation of a motor which drives elongated material processing apparatus subject to a plurality of processing loads including tension load.

Another object of the present invention is to provide tensionless IR compensation for motors which drive reduction mill stands.

A further object of the invention is to carry out the above objects by detecting the load component whose effect is to be deleted from the IR compensation, and providing a signal responsive to the detector to modify the IR compensation before it is injected into the motor regulating system.

Other and further objects of the present invention will become apparent from the following specification and drawings in which is illustrated a preferred embodiment of the invention in connection with motor control of a steel strip reduction rolling mill.

Figure 2:
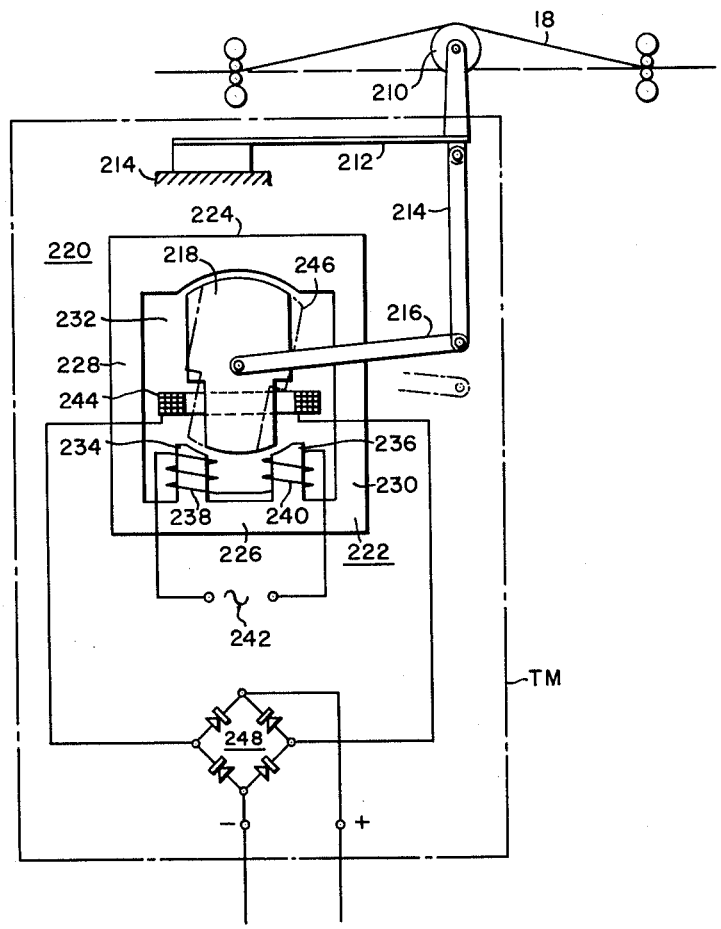

In the drawings:

FIG. 1 is a diagram of a four-stand reduction mill with motor drive and control circuits embodying the invention; and FIG. 2 is a diagram illustrating one example of a tensiometer which may be used in the control circuit of FIG. 1.

The illustrations being diagrammatic, the relative proportions and displacements of various elements therein are exaggerated.

In FIG. 1 there are shown four stands 10, 12, 14 and 16 of a tandem cold reduction mill for steel strip 18. The respective motor and control units associated with stands 10, 12, 14 and 16 are indicated at 20, 22, 24 and 26. Pay-off and winding reels 28 and 30 are shown at opposite ends of the mill system. All the motor and control units are alike and only one, unit 22 for the stand 12, is shown in detail.

In the motor and control unit 22 the numeral 32 indicates the drive motor for the stand 12, which motor has a field winding 34 energized from a suitable constant potential D.C. source through a rheostat 36. The motor 32 is part of a Ward Leonard system including a main motor supply generator 37 with brush terminals 38 and 39, and with a forward main field winding 40 and a reverse main field winding 42. The speed of motor 32 is controlled by controlling the power supply source which energizes the main field windings of the generator. The control is obtained by employing the difference between the voltage of generator 37 and the voltage of an adjustable reference source 44 as a control quantity for controlling the power supply source which energizes the main field windings of the generator. More specifically, this control quantity is employed to control a two-stage, two-channel push-pull magnetic amplifier 46 whose output is connected to the main field windings 40 and 42 of the generator. A channel F of amplifier 46 includes a first stage magnetic amplifier 50 and a second stage magnetic amplifier 52, the output of which is connected to the forward field winding 40 of generator 37. A channel R in amplifier 46 includes a first stage magnetic amplifier 54 and a second stage magnetic amplifier 56, the output of the latter being connected to the reverse field winding 42 of the generator.

Magnetic amplifiers 50 and 54 are of the self-saturating doubler type with D.C. outputs by virtue of bridge rectifiers 60 and 62 connected to the load windings of the respective amplifiers. Amplifier 50 includes a rectangular hysteresis core 64, main windings 66 and 68 in series with oppositely poled saturating rectifiers 70 and 72, a bias winding 74, a basic excitation winding 76, a control winding 78, and an anti-hunt feedback winding 80. Amplifier 54 is provided with a rectangular hysteresis core 82, load windings 84 and 86 in series with oppositely poled saturating rectifiers 88 and 90, a bias winding 92, a basic excitation winding 94, a control winding 96, and an anti-hunt feedback winding 98. The main windings of amplifiers 50 and 54 are supplied with A.C. through the respective bridge rectifiers 60 and 62 from a suitable A.C. source 100.

The basic excitation windings 76 and 94 are connected in series and to the reference source 44 which is a potentiometer connected across a suitable D.C. source 102 through a reversing switch 104. These windings are wound in opposite sense on their respective cores in order to have opposite effects on their respective associated amplifiers. That is, when current flows through these windings, one will tend to drive its associated amplifier down, while the other will tend to drive its associated amplifier up. In the particular arrangement shown, and with switch 104 in the forward position F, the current through winding 76 is in the direction to aid the self-saturation due at windings 66 and 68, that is in a direction to drive amplifier 50 upward in response to increase of current through winding 76. At the same time, current through winding 94 is in a direction which supplies flux components opposing the flux of self-saturation, thereby tending to drive amplifier 54 downward.

Control windings 78 and 96 are wound in opposite sense on their respective cores and are connected in series in a control loop 105 which includes the armature of generator 37, a tap 106 of potentiometer 44, a terminal 107 at the lower end of potentiometer 44, a line 108, windings 78 and 96, a line 110, an adjustable voltage gain resistor 112, a mixing resistor 114, a lead 116, a mixing resistor 118 and terminal 39 of the generator. Windings 76 and 78 are wound in the same direction on core 64. Likewise windings 94 and 96 are wound in the same direction on their associated core 82. Anti-hunt windings 80 and 98 are connected in a later described anti-hunt circuit coupled to the main fields of generator 37. The current through bias windings 74 and 92 is adjusted to operate the amplifiers 50 and 54 at approximately the midpoint of their linear output range when there is no signal on the other windings.

Amplifiers 52 and 56 are any suitable amplifiers for amplifying D.C. outputs of amplifiers 50 and 54 as developed across the D.C. terminals of rectifiers 60 and 62 respectively. For example, amplifiers 52 and 56 may be of the same general type as amplifiers 50 and 54 with D.C. outputs developed from the same type bridge rectifiers as in the first stage amplifier.

The arrangement of the control windings 78 and 96 and the polarities of the respective elements in the control loop 105 are such that when the switch 104 is set for the forward direction the reference voltage at terminals 106 and 107 tends to drive the amplifier 50 upward and amplifier 54 downward. This is opposed by the generator output voltage which tends to drive the amplifier 50 downward and amplifier 54 upward.

Since the motor 32 has a constant preselected excitation on its field 34, its speed is determined by the voltage on its armature for a given load, that is it is determined by the voltage of generator 37. Generator 37 is driven at constant speed and therefore the sense and magnitude in its voltage output is determined by the excitation of its field windings. As hereinbefore stated, the main field windings of the generator are energized from the outputs of the second stage amplifiers 52 and 56.

In normal operation, the forward field winding 40 of the generator is excited to provide a generator output voltage that will cause the motor 22 to rotate at a preselected speed. Under these conditions, and ignoring the effect of later described IR compensation, the voltage of generator 37 is matched against the voltage of the adjustable reference source 44 which appears between tap 106 and the terminal 107. That is, the summation of the voltages between the generator armature terminal 39 and terminal 107, which comprises only the voltage of the generator 37 and the voltage between tap 106 on potentiometer 44 and terminal 107, is approximately zero and, therefore, very little or no current will flow in the control circuit loop 105 as a result of voltages from these two sources. However, if a sudden load should be applied to the stand driven by the motor 22, or if the operator should change the voltage of the reference source 44 in order to change the speed of motor 22, then the voltage of generator 37 will differ from the reference voltage, thereby producing an error voltage whose sense is determined by which source supplies the greater voltage, and the magnitude of which is determined by the difference value between these voltages. Since the voltage difference appears between terminals 107 and 39, the circuit included between these points will be considered as the error source (included in the error source are the reference voltage and the voltage of the generator at the generator brushes). When an error voltage appears across the error source, a substantial current will circulate around the control circuit loop. This circulating current is used to return the motor 32 to the preselected speed if the error was caused by a deviation from that speed, or it is used to fix the speed of motor 32 at some new value if the error was caused by a change in voltage of the adjustable reference source 44. It may be noted at this point that the basic excitation windings 76 and 94 set the basic speed of the stand motor 32 whenever there is a voltage from source 102 on the reference 44 and not just when there is an error voltage between terminals 107 and 39.

In the specific examples shown and with the switch 104 in the forward position, the reference voltage is positive at the tap 106 and the generator voltage is positive at the armature terminal 37. Thus if the reference voltage dominates, it will drive the amplifier 50 up from the basic level set by the reference and winding 76, thereby to increase the output of the forward amplifier channel F to the forward field winding 40 of the generator. This in turn increases the generator voltage and thereby speed of motor 32. In case the generator voltage dominates over the reference voltage then the control will be in the opposite direction and will tend to drive the forward channel F down and the reverse channel R up. More specifically, if as the motor is running at a preselected speed a sudden load is applied to the mill stand driven by the motor, the motor speed will decrease under the load, and the voltage at the generator brushes will go down. Under these circumstances, the reference voltage dominates and the resultant current in the control loop 105 is in the saturating direction with respect to amplifier 50 and the desaturating direction in amplifier 54, thus forcing the output of amplifier 50 upward and that of amplifier 54 down, thereby increasing the forward field excitation of generator 37 until the speed of motor 32 has been restored to the preselected normal speed. The converse occurs to energize the reverse field when the load on the motor is suddenly decreased.

The aforementioned anti-hunt windings 80 and 98 in the first stage amplifiers 50 and 54 are supplied with derivative and direct differential feedback voltages from balancing potentiometers 120 and 121 across the forward and reverse fields 40 and 42, respectively, by means of a resistance-capacitance network 122, through RC filters 123 and 124. The network 122 serves as a damping circuit and acts to linearize the output of the forward and reverse channels F and R of amplifier 46. Networks 123 and 124 further improve the waveform of the output voltages and improve the commutation of the second stage of amplifier 46. The converse occurs when the load on the motor is suddenly decreased.

Assuming fixed fields and other constants, it can be shown that the speed of the motor is directly proportional to the motor armature supply voltage (in this case output voltage at generator brushes) minus the IR drop in the armature supply loop circuit of the motor. Thus while the armature supply voltage may be a fair indication of motor speed at no load, armature supply voltage minus IR armature loop drop is a much better indication of motor speed under load. For this reason it has been the practice for many years to introduce IR drop compensation into the speed regulator loop of the motor wherein the motor armature supply voltage is compared against a reference to regulate the speed of the motor.

In the specific apparatus described, an adjustable signal proportional to IR drop in the motor armature is provided on lines 130 and 132 by a potentiometer 134 connected across a commutating field 136 of motor 32. The signal on lines 130 and 132 is thereby proportional to the IR drop in the motor armature loop which in turn is proportional to load current in the loop. The IR drop signal is employed to control a push-pull amplifier 138, whose resultant D.C. output is applied in proper phase to mixing resistors 114 and 118 to inject into the regulating loop 105 an IR compensation control component in the same direction as the reference voltage component from the reference 44, that is in a saturating direction with respect to amplifier 50 when the system is set for forward operation.

Amplifier 138 is constituted by two single ended, doubler type, self-saturating amplifiers 140 and 142. Amplifier 140 includes a core 143 carrying a bias winding 144, an IR drop signal control winding 146, a damping feedback winding 148, and load windings 150 and 152 in series with saturating rectifiers 154 and 156. Load windings 150 and 152 are connected through the A.C. terminals of a bridge rectifier 158 and a transformer 159 to an A.C. source 160 to develop a D.C. output for the amplifier across the output terminals of rectifier 158. Amplifier 142 similarly includes a core 160 carrying a bias winding 162, an IR drop control winding 164, a feedback winding 166, and load windings 168 and 170 in series with saturating rectifiers 172 and 174. Source 160 also supplies A.C. to these load windings through a transformer 175 and a bridge rectifier 176 to develop a D.C. output for amplifier 142 at the D.C. output terminals of rectifier 176. The outputs of rectifiers 158 and 176 are respectively connected across mixing resistors 118 and 114 and are series opposed through line 116 and the rest of the regulating loop 105, whereby the differential of the output voltages of amplifiers 140 and 142 is summed into the regulating loop 105. Bias windings 144 and 162 are supplied with suitable bias current to set each amplifier to operate at approximately the midpoint of its linear range at no signal on the other windings. IR drop control windings 146 and 164 are wound in opposite sense, and are connected to lines 130 and 132 to receive therethrough the IR drop signal developed across potentiometer 134.

For proper operation of the control system, time delay is introduced into amplifier 138 by means of a derivative negative feedback circuit including series connected feedback windings 148 and 166, and an RC network consisting of a resistor 180 and a capacitor 182, the feedback loop being connected across the resultant output of amplifier 138. The time delay can be adjusted by adjusting the value of the elements of the network. A direct differential feedback path is obtained by using a resistor 184 in series with the same feedback windings 148 and 166, and shunting the RC network. The direct differential feedback reduces the residual output when the IR signal is zero and serves to linearize the output of the amplifiers within their operating range.

As hereinbefore pointed out control windings 146 and 164 are connected in series opposition and carry the current produced by the IR signal. Amplifiers 140 and 142 are operated at approximately 50 percent output and their outputs are increased or decreased in push-pull depending upon the sense of the circulating current. The mixing resistors 114 and 118 across the D.C. outputs of amplifiers 142 and 140 are in series in the regulating loop 105. Thus, any voltage output from the IR compensation amplifier 138 will provide an IR compensation control component in the loop 105, therefore changing the control current through control windings 78 and 96 to exert a control on the output of the amplifiers 50 and 54, and thus exert a control on the main field windings 40 and 42 of generator 37 and consequently on the speed of motor 32.

When the system is in the forward running direction with a motoring torque being supplied by the motor, the IR compensation circuit is arranged to aid the saturation of amplifier 142 while decreasing the saturation of amplifier 140 so that these amplifiers provide an output into the resistors 114 and 118 which will supply an IR compensating component in the direction to aid the voltage of reference 44, that is in a direction tending to increase the forward excitation field 40 of generator 37. Under these circumstances the polarity of the net IR compensating voltage introduced through resistors 118 and 114 is positive at the right end and negative at the left end of the resistor network. When the motor is operating in the reverse direction because of a reversal of switch 104 to the reverse position F, the IR component will be supplied into the regulating loop by the same amplifiers and resistors, but in the opposite direction for a motoring current.

In the specific circuit described up to this point, the IR compensation introduced into the speed regulating loop includes components due to rolling load, acceleration load and tension load. The current component of the IR drop of the motor armature supply loop is the motor load current and may be called $I_{\text{total}}$, and $$I_{\text{total}} = I_{\text{acc}} + I_{\text{roll}} - I_{\text{ft}} + I_{\text{bt}} \qquad (1)$$

and $$I_{\text{T}} = I_{\text{bt}} - I_{\text{ft}} \qquad (2)$$

where $I_{acc}$ is the accelerating load component, $I_{roll}$ is the rolling load component, $I_{ft}$ is the forward tension component, $I_{bt}$ is the back tension component, and $I_T$ is the total tension component.

In accordance with the present invention, IR drop compensation without at least a part of the tension component $I_T$ is introduced into the regulating loop, thus providing "tensionless" IR compensation. This is accomplished in the disclosed embodiment of the invention, by deriving signals which are a function of tension load, and employing these signals in the control of the IR compensation amplifier 138 in a manner to subtract the effect of the tension load components of the IR compensation signal supplied to the amplifier via lines 130 and 132.

Signals which are a function of tension in the metal strip 18 at selected points are provided by tensiometers 200, 202 and 204, each located between a different pair of mill stands. Tensiometers for producing electrical outputs which vary with the tension of strip material are well known devices. One class of such devices produces output signals in response to vertical displacement of a horizontally moving strip, such displacement being a function of the tension in the strip. A specific example of this type of tensiometer is shown in FIG. 2 wherein a contact roller 210, on top of which the strip 18 rides, is mounted on the free end of a horizontal cantilever spring 212 anchored to a stationary mounting 214. The free end of spring 212 is coupled through links 214 and 216 to a rotor 218, which is a movable magnetic core element of a a variable reluctance differential transformer 220. The transformer 220 has a magnetic stator 222 with top, bottom and side sections 224, 226, 228 and 230 defining an irregularly shaped central opening 232 in which rotor 218 is disposed. Extending into this opening are a pair of parallel poles 234 and 236 integral with the bottom section 226 of the stator. Encircling these poles are a pair of oppositely wound coils 238 and 240 connected in series and to a suitable source of A.C. 242. Windings 238 and 240 constitute the primary of the transformer.

A fixed secondary winding 244 is so disposed around a reduced section of the magnetic rotor 218 that the rotor inductively couples the secondary 244 to the primaries 238 and 240 in various degrees depending upon the position of rotor 218. The magnetic rotor 218 is a movable element in a magnetic circuit which includes the stator 222. The rotor 218 is rotatable about an axis 219 by movement of the rod 216 which is fixed to the rotor. When the rotor 218 is in the center or neutral position shown in solid lines in the drawing, the magnetic circuit reluctances of the primaries 234 and 236 are identical, and since the coils are of opposite polarity the flux linking the secondary 244 is zero, and the secondary is unenergized. However, when the rotor 218 is shifted from its neutral position to the dashed line position 246 in response to downward displacement of roller 210, the flux symmetry is lost, and the flux of one primary coil dominates to produce a resultant flux linking the secondary 244, thereby inducing a voltage in the secondary. The output of the secondary 244 is rectified by a bridge rectifier 248 to provide D.C. at the output terminals marked — and +.

The tensiometer is physically arranged and adjusted so that at its neutral position the upper horizontal tangent to the contact roll 210 is above the pass line of the metal strip 18, and when rotor 218 is fully deflected to provide maximum output, the upper horizontal tangent to the contact roller 210 is coincident with the pass line of the strip. At minimum tension, the strip is carried above the pass line by contact roller 210, and as the tension in the strip increases the strip approaches the pass line, thereby displacing the roller downward and moving the rotor 218 to produce a higher output from the secondary 244.

In FIG. 1, the tensiometer 200 is in a position to "measure" forward tension with respect to mill stand 10 and back tension with respect to mill stand 12. Tensiometer 202 is in position to measure forward tension with respect to stand 12 and back tension with respect to stand 14, while tensioemter 204 is in position to measure forward tension with respect to mill stand 14 and back tension with respect to mill stand 16.

A signal that is a function of back tension with respect to stand 12, derived by tensiometer 200 and developed across a resistor 252, is supplied to a pair of series connected oppositely poled windings 254 and 256 respectively wound on cores 143 and 160 of amplifiers 140 and 142. The output of tensiometer 200 is supplied as a back tension signal to modify the IR control amplifier 138 in such a manner as to oppose or cancel the effect on the amplifier of the back tension load component in the IR signal developed across potentiometer 134 and supplied through lines 130 and 132 to the IR control windings of the amplifier. A signal that is a function of forward tension with respect to stand 12, derived from tensiometer 202 and developed across a resistor 258, is supplied to series connected oppositely poled windings 260 and 262, respectively wound on cores 143 and 160 of amplifiers 140 and 142. The output of tensiometer 202 is employed as a forward tension signal to modify the control of amplifier 138 in a manner to oppose or nullify the effect on the amplifier of the forward tension load component of the IR signal supplied to the amplifier on lines 130 and 132.

The correct phasing of the forward and back tension signals with respect to the IR signals in the amplifier control is readily seen from Formula 1. In order to oppose or nullify the effect of the back tension component of the IR compensation signal in the amplifier, the back tension signal from tensiometer 200 must be in a direction in the amplifier to be opposed to or subtractive with respect to the IR signal. Thus, to cancel out or oppose the effect (on the amplifier) of the back tension component of the IR signal coursing through the IR control winding 146 and 164, the back tension signal from tensiometer 200 flows through control windings 254 and 256 in a direction to oppose the control effects of the IR control current flowing in windings 146 and 164.

On the other hand, in order to nullify or oppose the effect of the forward tension component of the IR compensation signal in the amplifier, the forward tension signal from tensiometer 202 must be in a direction in the amplifier to add to or aid the control effect of the IR signal in the amplifier. Thus, the forward tension signal of the strip 18 with respect to stand 12 is in such direction through windings 260 and 262 as to aid the control effects of the IR signal flowing through IR signal windings 146 and 164. The tension signals may be modified by adjusting rheostats 264 and 266. The value of tension signal supplied to the amplifier 138 is such as to produce or maintain the desired value of droop in the motor as a function of tension load. These rheostats are mechanically ganged with rheostat 36 in the circuit of the motor field 34 in order to modify the tensiometer signals in accordance with the positions of the field rheostat since the motor is operated over a speed range by the field control.

Tensiometer 202 supplies a back tension signal to the motor-control unit 24, which unit is supplied with a forward tension signal by tensiometer 204. The motor-control units driving the end stands 10 and 16 are supplied with only one tension signal. Motor-control unit 20 is supplied with a forward tension signal from tensiometer 200, while motor control unit 26 is supplied with a back tension signal from tensiometer 204. It will be appreciated that the IR compensation amplifier 138 in the motor control unit 20 will have the forward tension windings 260 and 262 but will not require the back tension windings 254 and 256. On the other hand, motor and control unit 26 in its amplifier 138, will require the back tension control windings 254 and 256 but will not need the forward tension control windings 260 and 262.

The present invention as applied to rolling mill control provides a major improvement in mill operation. It substantially eliminates the necessity of changing IR compensation with schedule changes and is a great aid to gauge control whether manual or automatic. With the control of this invention, higher IR compensations may be used, particularly on higher speed mills which thread at a small percentage of top speed.

While the invention has been described in connection with steel mill control with magnetic amplifiers working into a Ward Leonard motor control, it should be distinctly understood that these are simply illustrative of the principles of the invention and that other applications, arrangements, and embodiments are within the spirit and scope of the invention.

It is to be understood that the herein described arrangements are simply illustrative of the principles of the invention, and that other embodiments and applications are within the spirit and scope of the invention.

I claim as my invention:

1. In a control system for an electric motor that drives apparatus for working on strip material which subjects the apparatus to a plurality of loads including tension on the material, and wherein the system includes a source for supplying electrical power to said motor, said source and motor forming a motor circuit, regulating means responsive to variations in a motor condition from a predetermined value for controlling the power supplied by said source to said motor, and means for compensating said regulating means in accordance with IR drop in the motor circuit, the combination therewith of modifying means responsive to tension load for opposing the effect on said regulating means of that component of the IR drop due to said tension load.

2. In a control system for an electric motor that drives apparatus for working on strip material which subjects the apparatus to a plurality of loads including tension on the material, and wherein the system includes a source for supplying electrical power to said motor, said source and motor forming a motor circuit, regulating means responsive to variations in a motor condition from a predetermined value for controlling the power supplied by said source to said motor, and means for compensating said regulating means in accordance with IR drop in the motor circuit, the combination therewith of modifying means responsive to tension load for opposing the effect on said regulating means of that component of the IR drop due to said tension load, said modifying means comprising means for obtaining a signal which is a function of said tension load and means employing said signal for affecting said regulating means.

3. In a rolling mill for reducing strip material which comprises a mill stand driven by an electric motor, which stand and motor are subjected by the material to a plurality of loads including tension load, and wherein there is included a generator connected in a loop circuit with said motor for supplying the latter with energizing potential, regulating means responsive to variations in a motor condition from a predetermined value for controlling the power supplied by said generator to said motor, and compensating means coupled to said regulating means for compensating the regulating means in response to IR drop in the motor loop circuit, the combination therewith of means for subtracting from said compensating means a particular component due to said tension load, said subtracting means comprising means for obtaining a signal which is a function of said tension load, and means for affecting said compensating means with said signal.

4. In a control system for an electric motor that drives apparatus for working on strip material which subjects the apparatus to a plurality of loads including load due to tension of the material, and wherein the system includes a source for supplying electrical power to said motor, said source and motor forming a motor circuit, regulating means responsive to variations in a motor condition from a predetermined value for controlling the power supplied by said source to said motor, and compensating means coupled to said regulating means for compensating the regulating means in response to IR drop in the motor circuit, said compensating means comprising a magnetic amplifier having a control winding which is responsive to the IR drop of said motor and which tends to drive said amplifier up in response to increasing IR drop, means for subtracting from said compensating means a component due to said tension load, said subtracting means comprising detector means for detecting said tension load, and means responsive to said detector means for modifying the control of said amplifier in a manner which subtracts the tension component from the IR drop forces controlling the amplifier.

5. In a control system for an electric motor that drives apparatus which is subject to a plurality of load factors which form a composite load on the motor, and wherein a power source is connected to said motor for supplying the latter with electrical power, said source and motor forming a motor circuit, regulating means responsive to variations in a motor condition from a predetermined value for controlling the power supplied by said source to said motor, said regulating means including control means, a network including a voltage reference, a compensating signal source responsive to IR drop of the motor circuit, the output of said power source, and said control means, the polarities within the network being such that said control means is subjected to a component responsive to the power source output tending to decrease the output of said power source, and to components respectively responsive to said reference and said IR compensation which tend to increase the output of said power source, said compensating signal source comprising an amplifier having control means which is responsive to IR drop of said motor circuit and which tends to drive said amplifier up in response to increasing IR drop, means for subtracting from said compensating signal source a component due to a particular one of said load factors, said subtracting means comprising detector means for detecting said particular load factor, and means responsive to said detector means for modifying the control of the latter amplifier in a manner which subtracts said particular load factor component from the IR drop forces controlling the latter amplifier.

6. In a rolling mill for reducing strip material which comprises a mill stand driven by an electric motor which stand and motor are subjected by the material to a plurality of loads including tension load, a generator connected in a loop circuit with said motor for supplying the latter with energizing potential, regulating means responsive to variations in a motor condition from a predetermined value for controlling the power supplied by said generator to said motor, said regulating means including a magnetic amplifier having control winding means, and a network including a voltage reference, a compensating signal source responsive to IR drop of the motor circuit, the output of said generator, and said control winding means, the polarities within the network being such that said control winding means is subjected to a component responsive to the generator output tending to affect the amplifier to decrease the output of said generator, and to components respectively responsive to said reference and said IR compensation which tend to affect the amplifier to increase the output of the generator, said compensating signal source comprising a magnetic amplifier having a control winding control which is responsive to the IR drop of said motor loop circuit and which tends to drive the latter amplifier up in response to increasing IR drop, means for subtracting from said compensating signal source a component due to said tension load, said subtracting means comprising detector means for detecting said tension load, and means responsive to said detector means for modifying the control of the latter amplifier in a manner which subtracts the tension component from the IR drop forces controlling the latter amplifier.

7. In a control system for an electric motor that drives apparatus for working on strip material which subjects the apparatus to a plurality of loads including respective loads due to back tension and forward tension of the material, and wherein the system includes a source for supplying electrical power to said motor, said source and motor forming a motor circuit, regulating means responsive to variations in a motor condition from a predetermined value for controlling the power supplied by said source to said motor, and compensating means coupled to said regulating means and responsive to IR drop in the motor circuit, said compensating means comprising a magnetic amplifier having a control winding which is responsive to the IR drop of said motor and which tends to drive said amplifier up in response to increasing IR drop, the combination therewith of means for subtracting from said compensating means components respectively due to said forward and back tension loads, said subtracting means comprising back tension detector means, forward tension detecting means, means responsive to said back tension detector means for controlling said amplifier in a manner tending to drive the amplifier down, and means responsive to said forward tension detector means for controlling said amplifier in a manner tending to drive the amplifier upward.

8. In a control system for an electric motor that drives apparatus for working on strip material which subjects the apparatus to a plurality of loads including respective loads due to back tension and forward tension of the material, and wherein the system includes a source for supplying electrical power to said motor, said source and motor forming a motor circuit, regulating means responsive to variations in a motor condition from a predetermined value for controlling the power supplied by said source to said motor, and compensating means coupled to said regulating means for compensating the regulating means in response to IR drop in the motor circuit, said compensating means comprising an amplifier having control means which is responsive to the IR drop of said motor and which tends to drive said amplifier up in response to increasing IR drop, the combination therewith of means for subtracting from said compensating means components respectively due to said forward and back tension loads, said subtracting means comprising back tension detector means, forward tension detector means, means responsive to said back tension detector means for applying a control force to said amplifier which opposes the IR drop control force in the amplifier, and means responsive to said forward tension detector means for applying a control force to said amplifier which aids the IR drop control force on the amplifier.

9. In a control system for an electric motor that drives apparatus for working on strip material which subjects the apparatus and thereby the motor to a plurality of loads including tension load that collectively are a load on the motor, and wherein the system comprises a motor circuit including the motor and a source for supplying electrical power to said motor, means for providing a reference signal A, means for providing a signal B which is a function of a motor condition, means for providing a signal C which is a function of the IR drop in the motor circuit, means for providing a signal D which is a function of said tension load, a summing network wherein said signals are combined, regulating means responsive to said summing network for controlling the power supplied by said source to said motor thereby to regulate said motor condition, said signals being so arranged that by their effects on said regulator, the signals have the following effects on the motor: signal A tends to promote said condition; signal B tends to demote said condition; signal C tends to promote said condition; and signal D opposes the effect which that component of signal C that is due to said particular load component has on the motor.

10. In a control system for an electric motor that drives rolls between which strip material is processed, which rolls and motor are subject to a plurality of loads including back tension and forward tension, and wherein the system comprises a motor circuit including the motor and a source for supplying electrical power to said motor, means for providing a reference signal A, means for providing a signal B which is a function of a motor condition, means for providing a signal C which is a function of the IR drop in the motor armature component, means for providing a signal D which is a function of said back tension, means for providing a signal E which is a function of said forward tension, a summing network wherein said signals are combined to produce an output, regulating means responsive to said summing network for controlling the power supplied by said source to said motor thereby to regulate said motor condition, said signals being so arranged that by their effects on said regulator, the signals have the following effects on said regulator, the signals have the following effects on the motor: signal A tends to promote said condition; signal B tends to demote said condition; signal C tends to promote said condition; signal D tends to promote said condition; and signal E tends to demote said condition.

11. In a control system for an electric motor that drives apparatus for working on strip material which subjects the apparatus and motor to a plurality of loads including back tension and forward tension, and wherein the system comprises a motor circuit including the motor and a source for supplying electrical power to the motor, regulating means responsive to variations in a motor condition from a predetermined value for controlling the power supplied by said source to said motor, and means for compensating said regulating means in accordance with IR drop in the motor circuit, the combination therewith of modifying means responsive to said tension loads for affecting said regulating means to oppose the effect on the regulating means of those components of IR drop that are due to said tension loads, said modifying means comprising means responsive to back tension for opposing the effect of said IR drop on said regulator, and means responsive to forward tension for aiding the effect of said IR drop on said regulator.

12. In a control system for an electric motor that drives apparatus for working on strip material which subjects the apparatus and thereby the motor to a plurality of loads including tension load that collectively are a load on the motor, and wherein the system comprises a motor circuit including the motor and a source for supplying electrical power to said motor, means for providing a reference signal A, means for providing a signal B which is a function of the voltage across the motor circuit, means for providing a signal C which is a function of the IR drop in the motor circuit, means for providing a signal D which is a function of said tension load, a summing network wherein said signals are combined, regulating means responsive to said summing network for controlling the voltage supplied by said source to said motor, said signals being arranged to have the following effects on said regulator: signal A tends to increase the motor supply voltage; signal B tends to decrease said voltage; signal C tends to increase said voltage; and signal D opposes the effect which that component of signal C that is due to said particular load component has on said voltage.

13. In a control system for an electric motor that drives apparatus for working on strip material which subjects the apparatus and motor to a plurality of loads including back tension and forward tension, and wherein the system comprises a motor circuit including the motor and a source for supplying electrical power to the motor, and voltage regulating means for controlling the power supplied by said source to said motor, and means for compensating said regulating means in accordance with IR drop in the motor circuit, the combination therewith of modifying means responsive to said tension loads for affecting said regulating means to oppose the effect on the regulating means of those components of IR drop that are due to said tension loads, said modifying means comprising means responsive to back tension for opposing the effect of said IR drop on said regulator, and means responsive to forward tension for aiding the effect of said IR drop on said regulating means.

References Cited in the file of this patent

UNITED STATES PATENTS

| | | |
|---|---|---|
| 2,315,869 | Montgomery | Apr. 6, 1943 |
| 2,703,858 | Fennell et al. | Mar. 8, 1955 |
| 2,743,401 | Moore et al. | Apr. 24, 1956 |
| 2,773,228 | Moore et al. | Dec. 4, 1956 |

FOREIGN PATENTS

| | | |
|---|---|---|
| 526,655 | Canada | June 19, 1956 |
| 1,027,293 | Germany | Apr. 3, 1958 |